(12) United States Patent
Bashyam et al.

(10) Patent No.: US 11,367,878 B2
(45) Date of Patent: Jun. 21, 2022

(54) MEMBRANE ELECTRODE ASSEMBLY WITH IMPROVED ELECTRODE

(71) Applicant: BALLARD POWER SYSTEMS INC., Burnaby (CA)

(72) Inventors: Rajesh Bashyam, Richmond (CA); Ping He, Surrey (CA); Siyu Ye, Burnaby (CA)

(73) Assignee: BALLARD POWER SYSTEMS INC., Burnaby (CA)

(*) Notice: Subject to any disclaimer, the term of this patent is extended or adjusted under 35 U.S.C. 154(b) by 339 days.

(21) Appl. No.: 16/309,090

(22) PCT Filed: Jul. 31, 2017

(86) PCT No.: PCT/US2017/044591
§ 371 (c)(1),
(2) Date: Dec. 11, 2018

(87) PCT Pub. No.: WO2018/026682
PCT Pub. Date: Feb. 8, 2018

(65) Prior Publication Data
US 2019/0181457 A1    Jun. 13, 2019

Related U.S. Application Data

(60) Provisional application No. 62/370,144, filed on Aug. 2, 2016.

(51) Int. Cl.
*H01M 4/86* (2006.01)
*H01M 4/90* (2006.01)
(Continued)

(52) U.S. Cl.
CPC ....... *H01M 4/8652* (2013.01); *H01M 4/8647* (2013.01); *H01M 4/9016* (2013.01);
(Continued)

(58) Field of Classification Search
CPC .... H01M 4/9016; H01M 4/92; H01M 4/8652; H01M 8/1004
See application file for complete search history.

(56) References Cited

U.S. PATENT DOCUMENTS

| 5,395,705 A | 3/1995 | Door et al. |
| 6,335,112 B1 | 1/2002 | Asukabe et al. |

(Continued)

FOREIGN PATENT DOCUMENTS

| JP | 2003-123777 A | 4/2003 |
| WO | 2014/031956 A1 | 2/2014 |

OTHER PUBLICATIONS

Cheng et al., "Characterization of the Degree of Ru Crossover and Its Performance Implications in Polymer Electrolyte Membrane Fuel Cells," *Journal of The Electrochemical Society* 157(5):B714-B718, 2010.

(Continued)

*Primary Examiner* — Ula C Ruddock
*Assistant Examiner* — Frank A Chernow
(74) *Attorney, Agent, or Firm* — Seed Intellectual Property Law Group LLP

(57) ABSTRACT

A membrane electrode assembly comprises a polymer electrolyte interposed between an anode electrode and a cathode electrode, the anode electrode comprising an anode catalyst layer adjacent at least a portion of a first major surface of the polymer electrolyte, the cathode electrode comprising a cathode catalyst layer adjacent at least a portion of a second major surface of the polymer electrolyte; at least one of the anode and cathode catalyst layers comprising: a first catalyst composition comprising a noble metal; and a second composition comprising a metal oxide; wherein the second composition has been treated with a fluoro-phosphonic acid compound.

13 Claims, 2 Drawing Sheets

(51) Int. Cl.
*H01M 8/10* (2016.01)
*H01M 8/1004* (2016.01)
*H01M 4/92* (2006.01)

(52) U.S. Cl.
CPC .......... *H01M 4/9041* (2013.01); *H01M 4/92* (2013.01); *H01M 8/1004* (2013.01); H01M 2004/8684 (2013.01)

(56) References Cited

U.S. PATENT DOCUMENTS

| | | | |
|---|---|---|---|
| 6,936,370 B1 | 8/2005 | Knights et al. | |
| 7,537,857 B2 | 5/2009 | Andrews et al. | |
| 8,137,828 B2 | 3/2012 | Pierpont et al. | |
| 8,367,267 B2 | 2/2013 | Frey et al. | |
| 9,263,748 B2 | 2/2016 | Zhang et al. | |
| 9,350,025 B2 | 5/2016 | Monden et al. | |
| 2003/0008196 A1 | 1/2003 | Wessel et al. | |
| 2004/0013935 A1 | 1/2004 | Ye et al. | |
| 2004/0126644 A1* | 7/2004 | Bett ............... | H01M 8/1007 429/490 |
| 2004/0157110 A1 | 8/2004 | Knights et al. | |
| 2006/0019147 A1 | 1/2006 | Fukuda et al. | |
| 2009/0186248 A1 | 7/2009 | Ye | |
| 2012/0122016 A1 | 5/2012 | Jiang et al. | |
| 2012/0225367 A1 | 9/2012 | Tsubosaka et al. | |
| 2014/0322631 A1 | 10/2014 | Klose-Schubert et al. | |
| 2015/0111126 A1 | 4/2015 | Bashyam et al. | |
| 2021/0013519 A1 | 1/2021 | Bashyam et al. | |

OTHER PUBLICATIONS

He et al., "Relative Humidity Effect on Anode Durability in PEMFC Startup/Shutdown Processes," *ECS Transactions* 33(1):1273-1279, 2010.

Niedrach et al., "Electrocatalysts for Hydrogen/Carbon Monoxide Fuel Cell Anodes," *Electrochemical Technology*, 5(7-8):318-323, 1967.

Piela et al., "Ruthenium Crossover in Direct Methanol Fuel Cell with Pt—Ru Black Anode," *Journal of The Electrochemical Society* 151(12):A2053-A2059, 2004.

Taniguchi et al., "Analysis of electrocatalyst degradation in PEMFC caused by cell reversal during fuel starvation," *Journal of Power Sources* 130:42-49, 2004.

Banham et al., "Impact of $CeO_x$ Additives on Cathode Catalyst layer Poisoning," *ECS Transactions* 58(1):369-380, 2013.

Cheng et al., "Interactive Effects of Membrane Additives on PEMFC Catalyst Layer Degradation," *Journal of The Electrochemical Society* 160(1):F27-F33, 2013.

Coms et al., "Mitigation of Perfluorosulfonic Acid Membrane Chemical Degradation Using Cerium and Manganese Ions," *ECS Transactions* 16(2):1735-1747, 2008.

\* cited by examiner

MEMBRANE ELECTRODE ASSEMBLY WITH IMPROVED ELECTRODE

BACKGROUND OF THE INVENTION

Field of the Invention

The present invention relates to a membrane electrode assembly with an improved electrode for use in PEM fuel cells, and to catalyst-coated membranes and fuel cells comprising the improved electrode.

Description of the Related Art

Fuel cell systems are currently being developed for use as power supplies in numerous applications, such as automobiles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells ("PEM fuel cell") employ a membrane electrode assembly ("MEA"), which comprises a polymer electrolyte or ion-exchange membrane disposed between the two electrodes, namely a cathode and an anode. A catalyst typically induces the desired electrochemical reactions at the electrodes. Separator plates, or flow field plates for directing the reactants across one surface of each electrode substrate, are disposed on each side of the MEA.

In operation, the output voltage of an individual fuel cell under load is generally below one volt. Therefore, in order to provide greater output voltage, multiple cells are usually stacked together and are connected in series to create a higher voltage fuel cell stack. (End plate assemblies are placed at each end of the stack to hold the stack together and to compress the stack components together. Compressive force provides sealing and adequate electrical contact between various stack components.) Fuel cell stacks can then be further connected in series and/or parallel combinations to form larger arrays for delivering higher voltages and/or currents.

In practice, fuel cells need to be robust to varying operating conditions, especially in applications that impose numerous on-off cycles and/or require dynamic, load-following power output, such as automotive applications. For example, fuel cell anode catalysts are also preferably tolerant to cell voltage reversals and carbon monoxide poisoning; carbon-supported catalysts are also preferably resistant to corrosion during start up and shutdown procedures.

PEM fuel cells typically employ noble metal catalysts, and it is well known that such catalysts, particularly platinum, are very sensitive to carbon monoxide poisoning. This is a particular concern for the anode catalyst of fuel cells operating on reformate, but it also a concern for fuel cells operating on hydrogen, as carbon monoxide (CO) is sometimes present in the hydrogen supply as a fuel contaminant. As described by, e.g., Niedrach et al. in *Electrochemical Technology*, Vol. 5, 1967, p. 318, the use of a bimetallic anode catalyst comprising platinum/ruthenium, rather than monometallic platinum, shows a reduction in the poisoning effect of the CO at typical PEM fuel cell operating temperatures. Hence, Pt—Ru catalysts are typically employed as PEM fuel cell anode catalysts.

Ruthenium-based fuel cell catalysts are also useful for mitigating voltage reversals. Voltage reversals occur when a fuel cell in a series stack cannot generate sufficient current to keep up with the rest of the cells in the series stack. Several conditions can lead to voltage reversal in a PEM fuel cell, for example, including insufficient oxidant, insufficient fuel, and certain problems with cell components or construction. Reversal generally occurs when one or more cells experience a more extreme level of one of these conditions compared to other cells in the stack. While each of these conditions can result in negative fuel cell voltages, the mechanisms and consequences of such a reversal may differ depending on which condition caused the reversal. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions may occur, which may detrimentally affect fuel cell components. Component degradation reduces the reliability and performance of the affected fuel cell, and in turn, its associated stack and array.

As described in U.S. Pat. No. 6,936,370, fuel cells can also be made more tolerant to cell reversal by promoting water electrolysis over anode component oxidation at the anode. This can be accomplished by incorporating an additional catalyst composition at the anode to promote the water electrolysis reaction. As a result, more of the current forced through the fuel cell during voltage reversal can be consumed in the electrolysis of water rather than the oxidation of anode components. Among the catalyst compositions disclosed were Pt—Ru alloys, $RuO_2$ and other metal oxide mixtures and/or solid solutions including Ru.

U.S. Patent Application No. 2004/0013935 also describes an approach to improving cell voltage reversal tolerance by using anodes employing both a higher catalyst loading (at least 60 wt % catalyst) on an optional corrosion-resistant support, and incorporating certain unsupported catalyst compositions to promote the water electrolysis reaction. Disclosed preferred compositions include oxides characterized by the chemical formulae $RuO_x$ and $IrO_x$, where x is greater than 1 and particularly about 2, and wherein the atomic ratio of Ru to Ir is greater than about 70:30, and particularly about 90:10.

However, ruthenium has been shown to be unstable under certain fuel cell operating conditions. For example, Piela et al. (*J. Electrochem. Soc.*, 151 (12), A2053-A2059 (2004)), describe ruthenium crossover from Pt—Ru black catalyst and redeposition at the Pt cathode catalyst in direct methanol fuel cells (DMFC) and hydrogen/air fuel cells under abnormal conditions, such as cell reversal resulting in very high anode potentials (and under normal DMFC operating conditions). Piela et al. theorized that the Pt—Ru alloy should likely remain stable under DMFC operating conditions, and that the source of the ruthenium contamination was neutral hydrous $RuO_2$. Taniguchi et al. (*J. Power Sources*, 130, 42-49 (2004)) observed ruthenium dissolution from a carbon supported Pt—Ru anode catalyst as a result of high anode potentials experienced by the fuel cell under cell reversal conditions.

It has also been shown that Pt—Ru catalysts are prone to ruthenium dissolution at higher relative humidity operation and cathode carbon corrosion. For example, P. He et al. (*ECS Transactions*, 33 (1) 1273-1279 (2010)) found that relative humidity (RH) significantly impacted the degree of ruthenium dissolution and crossover, which subsequently affected the cell performance and CO tolerance. Lower operating RH during testing resulted in less ruthenium contamination on the cathode and lower performance losses. In addition, T. Cheng et al. (*Journal of The Electrochemical Society*, 157 (5) B714-B718 (2010)) investigated anode catalysts with different elemental compositions to cause various degrees of ruthenium crossover. It was found that after anode accelerated stress test cycles, ruthenium crossover and subsequent deposition on the cathode occurred, which resulted in significant fuel cell performance loss.

To mitigate ruthenium dissolution of Pt—Ru-based catalysts, U.S. Pat. No. 7,608,358 discloses an electrode assembly for a fuel cell comprising an anode catalyst layer, the anode catalyst layer comprising a first catalyst composition comprising a noble metal, other than ruthenium, on a corrosion resistant support material; a second catalyst composition comprising a single-phase solid solution of a metal oxide containing ruthenium; and a hydrophobic binder; wherein a through-plane concentration of an ionomer in the catalyst layer decreases as a function of distance from the electrolyte. '358 discloses that MEAs and fuel cells with such an electrode assembly demonstrated markedly improved cell reversal tolerance and performance in start/stop cycling tests, while retaining baseline performance and performance in the presence of CO. '358 also discloses the mechanisms for ruthenium crossover from the anode and the cathode, particularly due to start/stop cycling.

However, ruthenium oxide-based catalysts, such as those described in '358, are still be prone to ruthenium dissolution. As a result, there exists a need for membrane electrode assemblies and fuel cells that are more robust to operating conditions that impose numerous on-off cycles and/or require dynamic, load-following power output; are tolerant to cell voltage reversals; and resistant to carbon monoxide poisoning and corrosion during start up and shutdown procedures. The present invention addresses this need and provides associated benefits.

BRIEF SUMMARY OF THE INVENTION

In brief, a membrane electrode assembly comprises a polymer electrolyte interposed between an anode electrode and a cathode electrode, the anode electrode comprising an anode catalyst layer adjacent at least a portion of a first major surface of the polymer electrolyte, the cathode electrode comprising a cathode catalyst layer adjacent at least a portion of a second major surface of the polymer electrolyte; at least one of the anode and cathode catalyst layers comprising: a first catalyst composition comprising a noble metal; and a second composition comprising a metal oxide; wherein the second composition has been treated with a fluoro-phosphonic acid compound.

In further embodiments, the metal oxide of the second composition is selected from the group consisting of ruthenium oxide, iridium oxide, ruthenium iridium oxide, titanium oxide, cerium oxide, and their mixtures, solid solutions and composites thereof.

In specific embodiments, the fluoro-phosphonic acid compound is a fluoroalkyl-phosphonic acid compound. In further embodiments, the fluoro-phosphonic acid compound is 2-perfluorohexyl ethyl phosphonic acid. In other embodiments, the fluoro-phosphonic acid compound is (1H,1H,2H, 2H-heptadecafluorodec-1-yl) phosphonic acid.

In further embodiments, the first catalyst composition is in a first discrete layer and the second composition is in a second discrete layer in the at least one of the anode and cathode catalyst layers.

In another embodiment, a method of making a membrane electrode assembly, the membrane electrode assembly comprising a polymer electrolyte interposed between an anode electrode and a cathode electrode, the anode electrode comprising an anode catalyst layer adjacent at least a portion of a first major surface of the polymer electrolyte, the cathode electrode comprising a cathode catalyst layer adjacent at least a portion of a second major surface of the polymer electrolyte; at least one of the anode and cathode catalyst layers comprising a first catalyst composition comprising a noble metal, other than ruthenium; and a second composition comprising a metal oxide, wherein the second composition has been treated with a fluoro-phosphonic acid compound; the method comprising the steps of: dissolving the fluoro-phosphonic acid compound in a solvent to form a fluoro-phosphonic acid compound dispersion; dispersing the fluoro-phosphonic acid compound dispersion with a metal oxide; removing the solvent after dispersing the fluoro-phosphonic acid compound dispersion with the metal oxide to form the treated second composition; and providing the treated second composition to at least one of the anode catalyst layer and the cathode catalyst layer.

These and other aspects of the invention are evident upon reference in the attached drawings and following detailed description.

DETAILED DESCRIPTION

Figure 1A:
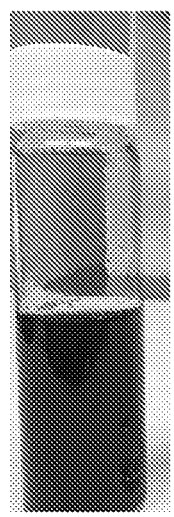
FIG. 1*a* shows the dispersion properties of the untreated RuIrOx powder in water.

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

A "corrosion resistant support material" is at least as resistant to oxidative corrosion as Shawinigan acetylene black (Chevron Chemical Company, TX, USA).

An electrochemical fuel cell includes a polymer electrolyte interposed between an anode electrode and a cathode electrode, a cathode catalyst layer between the polymer electrolyte and the cathode electrode, and an anode catalyst layer between the polymer electrolyte and the anode electrode. In one embodiment, the anode catalyst layer includes a first catalyst composition comprising a noble metal; and a second catalyst composition comprising a metal oxide; wherein the second catalyst composition has been treated with a fluoro-phosphonic acid compound. In specific embodiments, the metal oxide may be a ruthenium-containing metal oxide and/or an iridium-containing metal oxide.

The inventors surprisingly discovered that by treating the ruthenium-containing metal oxide with a fluoro-phosphonic acid compound, performance degradation due to ruthenium dissolution under voltage cycling conditions (i.e., start-up/shutdown) was reduced, thus indicating the ruthenium dissolution was reduced.

Without being bound by theory, the inventors suspect that covalent bonding of fluoroalkyl phosphonic acid with metal oxides through a self-assembly condensation process, which increased its hydrophobicity and reduced degradation.

However, the inventors expected that by treating the ruthenium-containing metal oxide with a fluoro-phosphonic acid compound, cell reversal tolerance would be reduced because water would be pushed away from the ruthenium-containing metal oxide (due to the hydrophobic fluorinated alkyl groups), which would reduce the capability of the metal oxide to electrolyze water. It was surprisingly discovered that cell reversal tolerance was generally unaffected with the treatment. Furthermore, the inventors discovered that cell reversal tolerance was also improved for iridium-containing metal oxides. Without being bound by theory, it is suspected that the treatment forms a thin layer of fluoro-phosphonic acid at the surface of the ruthenium-containing metal oxide that renders it hydrophobic through the self-assembled surface via covalent bonding, without significantly affecting the reaction sites (or surface area) for water electrolysis. In other words, it is suspected that the treatment renders a change in the local relative humidity of the catalyst layer without negatively affecting cell reversal tolerance.

In some embodiments, the average molecular weight of the fluoro-phosphonic acid compound ranges from about 200 to 1200. In specific embodiments, the average molecular weight of the fluoro-phosphonic acid compound ranges from about 300 to 1000.

In some embodiments, the fluoro-phosphonic acid compound has a chain length of six to twelve carbons in its backbone.

In one embodiment, the fluoro-phosphonic acid compound is a fluoroalkyl-phosphonic acid compound.

In specific embodiments, the fluoroalkyl-phosphonic acid compound is a perfluoro-phosphonic acid compound, such as 2-perfluorohexyl ethyl phosphonic acid and 1H, 1H, 2h, 2H-heptadecaflurorodec-1-yl phosphoric acid (C10-PFPA).

The first catalyst composition comprises at least one noble metal. The noble metal may comprise Pt or an alloy of Pt. In embodiments where a Pt alloy catalyst is employed, the alloy may include another noble metal, such as gold, ruthenium, iridium, osmium, palladium, silver; and compounds, alloys, solid solutions, and mixtures thereof. In some embodiments, the first catalyst composition comprises a mixture of a noble metal and non-noble metal, such as cobalt, iron, molybdenum, nickel, tantalum, tin, tungsten; and compounds, alloys, solid solutions, and mixtures thereof. While noble metals are described for the first catalyst composition, it is expected that non-noble metals, such as those described above, can also be used as the first catalyst composition in some applications.

The first catalyst composition may either be unsupported or supported in dispersed form on a suitable electrically conducting particulate support. In some embodiments, the support used is itself tolerant to voltage reversal. Thus, it is desirable to consider using supports that are more corrosion resistant.

The corrosion resistant support material may comprise carbon, if desired. High surface area carbons, such as acetylene or furnace blacks, are commonly used as supports for such catalysts. Generally, the corrosion resistance of a carbon support material is related to its graphitic nature: the more graphitic the carbon support, the more corrosion resistant it is. Graphitized carbon BA (TKK, Tokyo, JP) has a similar BET surface area to Shawinigan acetylene carbon and is a suitable carbon support material in some embodiments. In other embodiments suitable carbon support materials may include nitrogen-, boron-, sulfur-, and/or phosphorous-doped carbons, carbon nanofibres, carbon nanotubes, carbon nanohorns, graphenes, and aerogels.

Instead of carbon, carbides or electrically conductive metal oxides may be considered as a suitable high surface area support for the corrosion resistant support material. For instance, tantalum, titanium and niobium oxides may serve as a corrosion resistant support material in some embodiments. In this regard, other valve metal oxides might be considered as well if they have acceptable electronic conductivity when acting as catalyst supports.

In embodiments where the first catalyst composition is supported, the loading of the first catalyst composition on the support material is from about 20 to about 80% by weight, typically about 20 to about 50% by weight. For a noble metal catalyst, a lower catalyst loading on the support is typically preferred in terms of electrochemical surface area per gram of platinum (ECA), but a higher catalyst loading and coverage of the support appears preferable in terms of reducing corrosion of the support and in reducing catalyst loss during fuel cell operation.

In some embodiments, the amount of the first catalyst composition that is desirably incorporated will depend on such factors as the fuel cell stack construction and operating conditions (for example, current that may be expected in reversal), cost, desired lifetime, and so on. For example, the catalyst loading of the first catalyst composition may range from about 0.05 mg Pt/cm$^2$ on the low end for the anode electrode to about 0.8 mg Pt/cm$^2$ on the high end for the cathode electrode.

The second composition comprises a metal oxide, wherein the metal oxide may be, such as, but not limited to, ruthenium oxide, iridium oxide, titanium oxide, cerium oxide, and their mixtures, solid solutions and composites thereof. In addition, the metal oxide loading of the second composition may range from about 0.001 mg/cm$^2$ to about 0.10 mg/cm$^2$. It is expected that some empirical trials will determine an optimum amount for a given application. In some embodiments, the metal oxide may be supported on another metal oxide support.

In one embodiment, the metal oxide of the second composition comprises ruthenium. In specific embodiments, the metal oxide is a single-phase solid solution comprising ruthenium. In further embodiments, the second composition comprises a single-phase solid solution of ruthenium oxide (90:10 mole ratio of Ru:Ir). For example, the metal oxide of the second composition is, but not limited to, $RuO_2$ and $RuIrO_2$. As mentioned, the metal oxide may be supported on a catalyst support, such as $RuO_2$ supported on tantalum oxide, titanium oxide or niobium oxide.

In other embodiments, the second catalyst composition comprises a metal oxide comprising iridium, such as a single-phase solid solution of iridium oxide. As mentioned, the metal oxide may be supported on a catalyst support, such as $IrO_2$ supported on tantalum oxide, titanium oxide or niobium oxide.

In further embodiments, a mixture of treated metal oxides may be used, depending on the application.

In other embodiments, the first catalyst composition and the second composition may be in separate, discrete layers in the anode catalyst layer and/or cathode catalyst layer. For example, the first discrete layer with the first catalyst composition is adjacent the membrane and the second discrete layer with the second composition is adjacent the gas diffusion layer.

In one general method to treat the metal oxide of the second composition, a fluoro-phosphonic acid compound is dissolved in a first solvent, a metal oxide is dispersed in another solvent that may be the same or different from the first solvent, and then the dispersions are dispersed together via conventional methods. The solvents are then removed from the dispersion, such as by evaporating the solvent or centrifuging the dispersion or other methods known in the art, and then further heat-treated at an elevated temperature for an adequate amount of time to form a powder of the fluoro-phosphonic acid-treated metal oxide. The fluoro-phosphonic acid-treated metal oxide may contain about 1.0 wt % to about 20.0 wt % of the fluoro-phosphonic acid compound. Without being bound by theory, the phosphonic acid covalently bonds to the surface oxygen at the surface of the metal oxide with this treatment.

The second composition may be incorporated in the catalyst layer in various ways known in the art. In some embodiments, the first catalyst and second compositions may be mixed together and the mixture applied in a uniformly distributed common layer or layers on a suitable gas diffusion layer (GDL), polymer electrolyte membrane, or decal transfer sheet. With decal transfer, the catalyst layer may be decal transferred from the decal transfer sheet to a GDL to form a gas diffusion electrode, or may be decal transferred to a polymer electrolyte membrane to form a catalyst-coated membrane. As mentioned previously, the second composition may be supported on the same support material as the first catalyst composition, and thus both compositions are already "mixed" for application in one or more layers on an anode substrate, cathode substrate and membrane.

In further embodiments, the first catalyst composition and the second composition may instead be applied in discrete, separate layers on a GDL, polymer electrolyte membrane, or decal transfer sheet, thereby making a bilayer or multilayer structure. By applying the first catalyst composition in one discrete layer and a second composition in a second discrete layer, one may use different ionomers, solvents and processing steps for each of the first and second compositions.

In another embodiment, the second composition may be non-uniformly distributed, for example, located where degradation is expected to occur. Persons of ordinary skill in the art can readily select an appropriate manner of incorporation for a given application.

The anode and cathode catalyst layers typically further include a binder, such as an ionomer and/or hydrophobic agent.

In some embodiments, the through-plane concentration of ionomer in the present catalyst layer decreases as a function of distance from the polymer electrolyte interface. The presence of ionomer in the catalyst layer effectively increases the electrochemically active surface area of the catalyst, which requires an ionically conductive pathway to the cathode catalyst to generate electric current.

As previously mentioned, the anode and cathode catalyst layers may be applied to a GDL to form anode and cathode electrodes, or to a decal transfer sheet which is then decal transferred to a surface of the GDL or polymer electrolyte, or applied directly to the surface of the polymer electrolyte to form a catalyst-coated membrane (CCM). The electrodes or CCM can then be bonded under heat and/or pressure with other components to form an MEA. Alternatively, the application of the catalyst layer on the desired substrate may occur at the same time the remaining MEA components are bonded together.

The present catalyst layers may be applied according to known methods. For example, the catalyst may be applied as a catalyst ink or slurry, or as a dry mixture. Catalyst inks may be applied using a variety of suitable techniques (e.g., hand and machine methods, including hand brushing, notch bar coating, fluid bearing die coating, wire-wound rod coating, fluid bearing coating, slot-fed knife coating, three-roll coating, screen-printing and decal transfer) to the surface of the polymer electrolyte or GDL. Examples of dry deposition methods include spraying, vacuum deposition and electrostatic powder deposition techniques.

Catalyst inks typically incorporate the catalysts and binder in a solvent/dispersant to form a solution, dispersion or colloidal mixture. Suitable solvents/dispersants include water, organic solvents such as alcohols and polar aprotic solvents (e.g., N-methylpyrrolidinone, dimethylsulfoxide, and N,N-dimethylacetamide), and mixtures thereof. Depending on the amount of water, one can distinguish water-based inks, wherein water forms the major part of the solvents used, from inks wherein organic solvents form the major part. Catalyst inks may further include surfactants and/or pore forming agents, if desired. Suitable pore formers include methyl cellulose; sublimating pore-forming agents such as durene, camphene, camphor and naphthalene; and pore-forming solvents that are immiscible with the catalyst ink solvent/dispersant, such as n-butyl acetate in polar aprotic solvent/dispersant systems.

The selection of additional components for the catalyst mixture and the choice of application method and GDL to which it is applied are not essential to the present invention, and will depend on the physical characteristics of the mixture and the substrate to which it will be applied, the application method and desired structure of the catalyst layer. Persons of ordinary skill in the art can readily select suitable catalyst mixtures and application methods for a given application.

EXAMPLES

Example 1

Five grams of ruthenium iridium oxide ($RuIrO_2$) powder purchased from Johnson Matthey (Reading, UK) was dispersed in 60 mL of ethanol. 0.56 g of 2-perfluorohexyl ethyl phosphonic acid precursor (Unimatech, Japan) was separately dissolved in 5 mL of ethanol. Subsequently, the dispersion containing the $RuIrO_2$ was probe ultasonicated. The solution containing the dissolved precursor was added to the sonicated dispersion in a dropwise manner (at about a flow rate of 1 mL/min) while stirring at room temperature for about 60 minutes. The dispersion was then transferred to a petri dish and evaporated at about 60 degrees Celsius overnight. The free flowing powder was transferred to an oven and heated to 150 degrees Celsius for 30 minutes, resulting in the final treated $RuIrO_2$ powder with about 10 wt % of perfluorohexyl ethyl phosphonic acid.

Figure 1B:
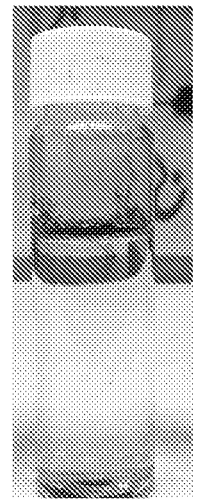
FIG. 1*b* shows the dispersion properties of the treated RuIrOx powder in water.

FIG. 1 shows the picture of treated $RuIrO_2$ powder (right) in comparison to non-treated $RuIrO_2$ (left) dispersed in water. As it can be seen, the treated $RuIrO_2$ powder is completely hydrophobic and water could not wet the surface and, hence, it floats on water, even though the density of $RuIrO_2$ is higher than water. On the other hand, non-treated $RuIrO_2$ powder disperses well in water as it is highly hydrophilic.

Example 2

Four grams of ruthenium iridium oxide ($RuIrO_2$) powder purchased from Johnson Matthey (Reading, UK) was dispersed in 50 mL of isopropanol. 0.4 g of (1H,1H,2H,2H-heptadecafluorodec-1-YL) phosphonic acid (C10-PFPA) precursor (Advanced Technology and Industrial CO., LTD, Hong Kong) was separately dissolved in 50 mL of isopropanol. Subsequently, the dispersion containing the $RuIrO_2$ was probe ultrasonicated. The solution containing the dissolved precursor was added to the sonicated dispersion in a dropwise manner (at about a flow rate of 1 mL/min) while stirring at room temperature overnight. The dispersion was then centrifuged to separate the catalyst from the solution. The powder at the bottom of the centrifuge tube was dried in a vacuum oven at 80 degrees Celsius for overnight, resulting in the final treated $RuIrO_2$ powder with about 2 wt % of C10-PFPA.

Example 3

Five grams of iridium oxide ($IrO_2$) powder purchased from Tanaka Kikinzoku International, Inc. (USA) was dispersed in 50 mL of 1-propanol. 0.35 g of (1H,1H,2H,2H-heptadecafluorodec-1-YL) phosphonic acid (C10-PFPA) precursor was separately dissolved in 30 mL of 1-propanol. Subsequently, the dispersion containing the $IrO_2$ was probe ultrasonicated. The solution containing the dissolved precursor was added to the sonicated dispersion in a dropwise manner (at about a flow rate of 1 mL/min) while stirring at room temperature. The dispersion was then heated up to 100 degrees Celsius for approximately 3 hours to evaporate all the solvent, resulting in the final treated $IrO_2$ powder with about 7 wt % of C10-PFPA.

The treated $RuIrO_2$ powder of Examples 1 and 2, as well as the $IrO_2$ powder of Example 3, were then dispersed in a Nafion®/alcohol mixture with a platinum-based catalyst, then applied to a decal transfer film and subsequently decal transferred via heat and pressure to a half CCM (Nafion® 211 membrane with cathode catalyst on one side) to form a full CCM. Untreated $RuIrO_2$ powder and untreated $IrO_2$ powder were also incorporated in a similar fashion to form full CCMs.

The MEAs were made with the following electrode structures as listed in Table 1, with the CCM sandwiched between two AvCarb® GDLs (AvCarb Materials Solutions, Lowell, Mass.). The GDLs were bonded to the CCM via heat and pressure. The active area of each of the MEAs was 45 $cm^2$.

TABLE 1

Anode and cathode catalyst structures for MEAs

| MEA Example | Anode | Cathode |
| --- | --- | --- |
| Comparative MEA 1 | 50% Pt supported on graphitized carbon black at a catalyst loading of ~0.1 mg Pt/$cm^2$; ~0.06 mg/$cm^2$ untreated $RuIrO_2$ (single-phase solid solution (90:10 mole ratio Ru/Ir); Johnson Matthey Plc, Reading, UK); Ionomer (23%): Nafion ® | 50% Pt supported on graphitized carbon black at ~0.4 mg Pt/$cm^2$ Ionomer (23%): Nafion ® |
| MEA 2 ($RuIrO_2$ of Example 1) | 50% Pt supported on graphitized carbon black at a catalyst loading of ~0.1 mg Pt/$cm^2$; ~0.06 mg/$cm^2$ $RuIrO_2$ (single-phase solid solution (90:10 mole ratio Ru/Ir); Johnson Matthey Plc, Reading, UK) treated with 2-perfluorohexyl ethyl phosphonic acid; Ionomer (23%): Nafion ® | 50% Pt supported on graphitized carbon black at ~0.4 mg Pt/$cm^2$ Ionomer (23%): Nafion ® |
| MEA 3 ($RuIrO_2$ of Example 2) | 50% Pt supported on graphitized carbon black at a catalyst loading of ~0.1 mg Pt/$cm^2$; ~0.06 mg/$cm^2$ $RuIrO_2$ (single-phase solid solution (90:10 mole ratio Ru/Ir); Johnson Matthey Plc, Reading, UK) treated with C10 PFPA; Ionomer (23%): Nafion ® | 50% Pt supported on graphitized carbon black at ~0.4 mg Pt/$cm^2$ Ionomer (23%): Nafion ® |
| Comparative MEA 4 | 50% Pt supported on graphitized carbon black at a catalyst loading of ~0.05 mg Pt/$cm^2$; ~0.026 mg/$cm^2$ $IrO_2$ (TKK); Ionomer (20%): Nafion ® | 50% Pt supported on graphitized carbon black at ~0.4 mg Pt/$cm^2$ Ionomer (23%): Nafion ® |
| MEA 5 ($IrO_2$ of Example 3) | 50% Pt supported on graphitized carbon black at a catalyst loading of ~0.05 mg Pt/$cm^2$; ~0.026 mg/$cm^2$ $IrO_2$ (TKK); treated with C10 PFPA; Ionomer (20%): Nafion ® | 50% Pt supported on graphitized carbon black at ~0.4 mg Pt/$cm^2$ Ionomer (23%): Nafion ® |

The MEAs were then tested in a Ballard Standard Test Cell (STC) test fixture with graphite plates. The fuel cells were first conditioned overnight under the following conditions at 1.3 A/$cm^2$:

TABLE 2

Conditioning parameters

| | |
| --- | --- |
| Temperature | 75° C. (coolant) |
| Inlet Dew Point | 75° C. (fuel and oxidant) |
| Fuel | 100% hydrogen |
| Oxidant | air |
| Reactant inlet pressure | 5 psig (fuel and oxidant) |
| Reactant flow | 4.5 (fuel), 9.0 (oxidant) slpm |

Cell Reversal Testing

Figure 2:
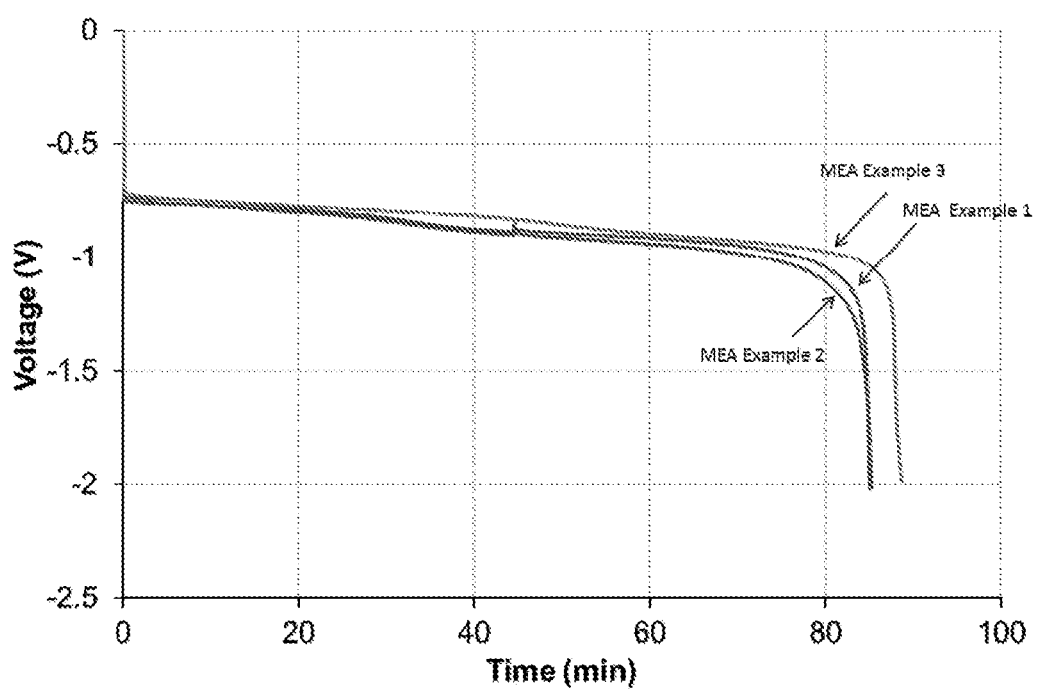
FIG. 2 shows the cell reversal tolerance test results of the fuel cells with the treated and untreated catalyst compositions on the anode.

The fuel cells were conditioned overnight at 1.3 A/cm² at the conditions listed in Table 2. The fuel supply was then switched to humidified nitrogen and the cell was supplied with 200 mA/cm² of current through an external power supply under current control mode. The cell reversal tolerance time was monitored until the cell voltage reached −2.0 V FIG. 2 shows that the first three fuel cells exhibited almost exactly the same behavior with almost the same cell reversal times (85 minutes for MEA 1 and MEA 1, and 89 minutes for MEA 3). Therefore, the treatment of $RuIrO_2$ with either perfluorohexyl ethyl phosphonic acid or C10-PFPA did not significantly impact cell reversal tolerance, which, as discussed above, is a surprising and unexpected result due to the expected lower surface area of the $RuIrO_2$ after treatment.

For iridium oxide, it was shown that MEA 5 with a C10-PFPA-treated iridium oxide had a significantly improved cell reversal time in comparison to Comparative MEA 4, which did not have the C10-PFPA treatment. Comparative MEA 4 had a cell reversal time of less than 300 minutes while MEA 5 had a cell reversal time of greater than 450 minutes. Thus, the treatment of $IrO_2$ with C10-PFPA had a positive effect on cell reversal tolerance.

Anode Accelerated Stress Test

Anode accelerated stress tests (ASTs) were used to simulate potential spikes that occur during fuel cell start-ups and shutdowns to induce ruthenium dissolution and crossover.

The fuel cells were operated at 75° C., 5 psig (136 kPa) pressure, and 100% inlet RHs, 70% $H_2$/30% $N_2$ for the fuel, and a beginning of life (BOL) polarization was obtained. During the AST, the anode potential cycled between ~0 and 0.9 V by switching the fuel between 70% $H_2$/30% $N_2$ for 1 minute and 100% $N_2$ for 30 seconds, while the cathode potential was kept below 1.0 V to minimize cathode degradation. Unless otherwise stated, all half-cell potentials reported here are relative to the dynamic hydrogen reference electrode (DHE). After the AST, the fuel cells were again operated at the same conditions as the BOL polarization, and an end of life (EOL) polarization was obtained.

At 1 A/cm², it was shown that MEA 2 had a performance loss of 38 mV less than the baseline MEA 1, and MEA 3 had a performance loss of 67 mV less than the baseline MEA 1. Therefore, by treating the $RuIrO_2$ catalyst with either perfluorohexyl ethyl phosphonic acid or C10-PFPA, the MEAs with the treated $RuIrO_2$ catalyst exhibited significantly less performance loss at 1 A/cm² than the untreated MEA.

While the treated metal oxides have been described for the anode electrode in the preceding description, it is contemplated that such treated metal oxides may, additionally or alternatively, be used on the cathode electrode. Without being bound by theory, such treated metal oxides are beneficial for improved durability by mitigating carbon corrosion at high cathode potentials by acting as a water electrolysis catalyst.

While the present electrodes have been described for use in PEM fuel cells, it is anticipated that they may be useful in other fuel cells having an operating temperature below about 250° C. They are particularly suited for acid electrolyte fuel cells, including phosphoric acid, PEM and liquid feed fuel cells. It is also contemplated that this treatment may also be useful for other metal oxides comprising ruthenium.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

This application also claims the benefit of U.S. Provisional Patent Application No. 62/370,144, filed Aug. 2, 2016, and is incorporated herein by reference in its entirety.

What is claimed is:

1. A method of making a membrane electrode assembly, the membrane electrode assembly comprising a polymer electrolyte interposed between an anode electrode and a cathode electrode, the anode electrode comprising an anode catalyst layer adjacent at least a portion of a first surface of the polymer electrolyte, the cathode electrode comprising a cathode catalyst layer adjacent at least a portion of a second surface of the polymer electrolyte, at least one of the anode and cathode catalyst layers comprising a first catalyst composition comprising a noble metal, other than ruthenium, and a second composition comprising a metal oxide, wherein the second composition has been treated with a fluoro-phosphonic acid compound, the method including:
   forming a fluoro-phosphonic acid compound dispersion by dissolving the fluoro-phosphonic acid compound in a solvent;
   dispersing the fluoro-phosphonic acid compound dispersion with a metal oxide;
   forming the treated second composition by removing the solvent after dispersing the fluoro-phosphonic acid compound dispersion with the metal oxide; and
   applying the treated second composition to at least one of the anode catalyst layer and the cathode catalyst layer.

2. The method of claim 1, further comprising heating the treated second composition at a temperature above room temperature prior to applying the treated second composition to at least one of the anode catalyst layer and the cathode catalyst layer.

3. The method of claim 1, wherein the fluoro-phosphonic acid compound is a fluoroalkyl-phosphonic acid compound.

4. The method of claim 1, wherein the fluoro-phosphonic acid compound is 2-perfluorohexyl ethyl phosphonic acid.

5. The method of claim 1, wherein the fluoro-phosphonic acid compound is (1H,1H,2H,2H-heptadecafluorodec-1-yl) phosphonic acid.

6. The method of claim 1, wherein the fluoro-phosphonic acid compound has a molecular weight of at least 300.

7. The method of claim 1, wherein the fluoro-phosphonic acid compound has a chain length of six to twelve carbons.

8. The method of claim 1, wherein the noble metal of the first catalyst composition comprises platinum or a platinum alloy.

9. The method of claim 1, wherein the metal oxide of the second composition is a single-phase solid solution comprising ruthenium.

10. The method of claim 1, wherein the metal oxide of the second composition is a single-phase solid solution comprising iridium.

11. The method of claim 1, wherein the metal oxide of the second composition is selected from the group consisting of ruthenium oxide, iridium oxide, titanium oxide, cerium oxide, and their mixtures, solid solutions and composites thereof.

12. The method of claim 1, wherein:
the anode catalyst layer includes a first catalyst composition comprising a noble metal, other than ruthenium, and a second composition comprising a metal oxide, wherein the second composition has been treated with a fluoro-phosphonic acid compound; and
the cathode catalyst layer does not include a first catalyst composition comprising a noble metal, other than ruthenium, and a second composition comprising a metal oxide, wherein the second composition has been treated with a fluoro-phosphonic acid compound.

13. The method of claim 1, wherein the first catalyst composition has not been treated with a fluoro-phosphonic acid compound.

* * * * *